(12) United States Patent
Ye et al.

(10) Patent No.: US 11,923,521 B2
(45) Date of Patent: Mar. 5, 2024

(54) WATER COOLING ASSEMBLY, BATTERY PACK, AND DEVICE

(71) Applicant: CONTEMPORARY AMPEREX TECHNOLOGY CO., LIMITED, Ningde (CN)

(72) Inventors: Weida Ye, Ningde (CN); Xiang Li, Ningde (CN); Yanlong Gu, Ningde (CN); Xiaoteng Huang, Ningde (CN); Peng Yan, Ningde (CN); Wenli Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 18/086,791

(22) Filed: Dec. 22, 2022

(65) Prior Publication Data
US 2023/0128468 A1    Apr. 27, 2023

Related U.S. Application Data

(63) Continuation of application No. PCT/CN2021/082201, filed on Mar. 22, 2021.

(30) Foreign Application Priority Data

Jun. 24, 2020 (CN) .......................... 202021195337.X

(51) Int. Cl.
*H01M 10/613* (2014.01)
(52) U.S. Cl.
CPC ................................. *H01M 10/613* (2015.04)
(58) Field of Classification Search
CPC ........... H01M 10/613; H01M 2220/20; H01M 10/6568; H01M 10/625; H01M 10/6551; H01M 10/6554; H01M 10/6556; H01M 50/209; H01M 50/249; H01M 50/244; Y02E 60/10
See application file for complete search history.

(56) References Cited

U.S. PATENT DOCUMENTS

| | | | | |
|---|---|---|---|---|
| 2015/0086831 A1* | 3/2015 | Haussmann | ........ | H01M 10/625 429/120 |
| 2016/0036104 A1* | 2/2016 | Kenney | ..................... | F28F 3/12 165/170 |
| 2018/0241102 A1* | 8/2018 | Kim | ................... | H01M 10/6568 |
| 2018/0337434 A1* | 11/2018 | Burgers | ..................... | F28F 9/02 |
| 2019/0016231 A1* | 1/2019 | Scaringe | ............. | H01M 10/613 |

FOREIGN PATENT DOCUMENTS

| | | |
|---|---|---|
| CN | 206397586 U | 8/2017 |
| CN | 107509367 A | 12/2017 |
| CN | 108987851 A | 12/2018 |
| EP | 3336958 A1 | 6/2018 |
| JP | 2012156057 A | 8/2012 |
| JP | 2014-203535 A | 10/2014 |
| JP | 2020088109 A | 6/2020 |
| KR | 20020036461 A | 5/2002 |
| KR | 20170065906 A | 6/2017 |
| WO | 2012029270 A1 | 3/2012 |
| WO | 2017033412 A1 | 3/2017 |
| WO | 2021258792 A1 | 12/2021 |

OTHER PUBLICATIONS

ISR for International Application PCT/CN2021/082201 dated Jun. 21, 2021.
Written Opinion for International Application PCT/CN2021/082201 dated Jun. 21, 2021.
Korea Office Action for Application No. 10-2022-7035704, dated Dec. 19, 2022, 7 pages.
Written Opinion for Application No. PCT/CN/2021/082201, dated Jun. 21, 2021, 4 pages.
Notice of Reasons for Refusal for JP Application No. 2022-560360, dated Apr. 14, 2023, 4 pages.
Korean Written Decision for Application No. 10-2022-7035704, dated Mar. 13, 2023, 3 pages.

* cited by examiner

*Primary Examiner* — Muhammad S Siddiquee
(74) *Attorney, Agent, or Firm* — Ladas & Parry LLP

(57) ABSTRACT

Embodiments of the present application relate to the technical field of batteries, and provide a water cooling assembly, a battery pack, and a device in order to solve the technical problem of low cooling efficiency of a cooling assembly of a battery pack. The water cooling assembly is configured to cool a cell, and includes: a body portion having a cooling channel for receiving a coolant; a first connecting portion connected to the body portion and having a communication cavity for introducing or draining the coolant; and a second connecting portion arranged between the body portion and the first connecting portion and having an inner cavity for communicating the cooling channel with the communication cavity. An end face of the inner cavity close to the cooling channel has a cross-sectional area greater than that of an end face of the communication cavity close to the inner cavity.

10 Claims, 15 Drawing Sheets

WATER COOLING ASSEMBLY, BATTERY PACK, AND DEVICE

CROSS REFERENCE TO RELATED APPLICATION

The present application is a continuation of PCT application PCT/CN2021/082201 filed on Mar. 22, 2021 which claims the priority of Chinese patent application no. 202021195337.X, entitled "WATER COOLING ASSEMBLY, BATTERY PACK, AND DEVICE" and filed on Jun. 24, 2020, the entire content of both application is incorporated herein by reference.

TECHNICAL FIELD

Embodiments of the present application relate to the technical field of batteries, and in particular, to a water cooling assembly, a battery pack, and a device.

BACKGROUND ART

Devices such as automobiles, electric bicycles, ships, and energy storage cabinets include battery packs, which provide power for the devices.

In the related art, taking a vehicle as an example, the vehicle comprises a vehicle body, and a battery pack capable of providing electric energy to the vehicle body so as to drive the vehicle to run. The battery pack herein may comprise a cell and a cooling assembly for cooling the cell.

However, in some cases, the cooling efficiency of the cooling assembly is low, so that the charge/discharge efficiency of the battery pack is reduced, resulting in a low energy efficiency of the device such as a vehicle.

SUMMARY OF THE INVENTION

In view of the above problem, embodiments of the present application provide a water cooling assembly, a battery pack, and a device to increase the cooling efficiency of the cooling assembly, and to increase the charge/discharge efficiency of the battery pack and the energy efficiency of a device such as a vehicle using the battery pack.

In order to achieve the above objective, the embodiments of the present application provide the following technical solutions:

According to a first aspect of the embodiments of the present application, provided is a water cooling assembly for cooling a cell, the water cooling assembly comprising: a body portion having a cooling channel for receiving a coolant; a first connecting portion connected to the body portion and having a communication cavity for introducing or draining the coolant; and a second connecting portion arranged between the body portion and the first connecting portion and having an inner cavity for communicating the cooling channel with the communication cavity, wherein an end face of the inner cavity close to the cooling channel has a cross-sectional area greater than that of an end face of the communication cavity close to the inner cavity.

The end face of the inner cavity close to the cooling channel has a cross-sectional area greater than that of the end face of the communication cavity close to the inner cavity, so that the flow rate of the coolant entering the cooling channel can be reduced or the coolant can flow out of the cooling channel at a lower flow rate, that is, the pressure loss of the coolant at the second connecting portion is reduced, and the cooling efficiency of the water cooling assembly is increased.

In the water cooling assembly as described above, the inner cavity has a first end and a second end that are arranged opposite to each other in a flow direction of the coolant, the first end of the inner cavity is configured to be in communication with the cooling channel, and the cross-sectional area of the inner cavity is gradually decreased from the first end of the inner cavity to the second end of the inner cavity.

The inner cavity is a tapered cavity with a gradually changing cross-sectional area, the larger end of the inner cavity is the first end and is connected to the cooling channel, and the smaller end of the inner cavity is the second end and is connected to the communication cavity, so that the inner cavity is in communication with the communication cavity and the cooling channel.

In the water cooling assembly as described above, the cross-sectional area of the inner cavity is the same at any position thereof.

The inner cavity having the same cross-sectional area at any position thereof is easy to machine and manufacture.

In the water cooling assembly as described above, the second connecting portion comprises: a first pipe segment connected to the body portion; and a second pipe segment connected between the first pipe segment and the first connecting portion.

A cavity in the first pipe segment and a cavity in the second pipe segment each have the same cross-sectional area, the cross-sectional area of the cavity in the first pipe segment is greater than that of the cavity in the second pipe segment, and the cross-sectional area of the cavity in the second pipe segment is greater than that of the communication cavity, so that the pipe segments may be formed by means of a pipe expanding process and are easy to machine and manufacture.

In the water cooling assembly as described above, the second connecting portion is integrally formed with the body portion.

When the second connecting portion is integrally formed with the body portion, the second connecting portion may be a projection portion formed on the first plate. The projection portion may be located at a water intake end or a water output end, or be arranged at both the water intake end and the water output end.

In the water cooling assembly as described above, an end face of the inner cavity close to the communication cavity has a cross-sectional area smaller than or equal to that of an end face of the body portion close to the inner cavity.

The end face of the inner cavity close to the communication cavity has a cross-sectional area less than or equal to that of the end face of the body portion close to the inner cavity, so that sudden expansion and contraction can be both avoided at the position where the second connecting portion is in communication with the cooling channel, and the pressure loss of the coolant is smaller.

In the water cooling assembly as described above, the body portion comprises a first plate and a second plate that are arranged opposite each other, and the side of the first plate facing the second plate and/or the side of the second plate facing the first plate is provided with a groove for forming the cooling channel.

Grooves are pressed on both the first plate and the second plate, and the two grooves are arranged opposite each other and are in communication with each other, so that the cooling channel formed by the two grooves has a large cross-sectional area, the coolant has a low flow rate and a small pressure loss, and the cooling assembly has a high heat exchange rate.

In the water cooling assembly as described above, the second connecting portion is arranged on the side of the first plate facing away from the second plate and/or the side of the second plate facing away from the first plate.

The second connecting portion is located on the side of the first plate facing away from the second plate, and the second connecting portion may be firmly connected to the first plate, providing a good sealing performance.

Compared with the prior art, the water cooling assembly provided in the embodiments of the present application has the following advantages: The water cooling assembly includes a body portion provided with a cooling channel, and a first connecting portion having a communication cavity in communication with the cooling channel, a coolant is introduced into the cooling channel from the communication cavity or drained from the communication cavity, and the coolant exchanges heat with a cell during flowing in the cooling channel to cool the cell. A second connecting portion is further provided between the first connecting portion and the body portion, the second connecting portion is provided with an inner cavity for communicating the communication cavity with the cooling channel, and an end face of the inner cavity close to the cooling channel has a cross-sectional area greater than that of an end face of the communication cavity close to the inner cavity, so that the flow rate of the coolant entering the cooling channel can be reduced or the coolant can flow out of the cooling channel at a lower flow rate, that is, the pressure loss of the coolant at the second connecting portion is reduced, and the cooling efficiency of the water cooling assembly is increased.

According to a second aspect of the embodiments of the present application, provided is a battery pack, comprising: a plurality of cells and the water cooling assembly described in the first aspect, wherein the water cooling assembly is configured to cool the plurality of cells.

According to a third aspect of the embodiments of the present application, provided is a battery-powered device, the device comprising: the battery pack described in the second aspect, wherein the battery pack provides electric energy to the device.

In addition to the above-mentioned technical problem to be solved by the embodiments of the present application, the technical features constituting the technical solutions and the advantageous effects brought about by the technical features of these technical solutions, other technical problems that can be solved by the water cooling assembly, the battery pack and the device provided by the embodiments of the present application, other technical features included in the technical solutions and the advantageous effects brought about by these technical features will be explained in further detail in the detailed description of embodiments.

BRIEF DESCRIPTION OF THE DRAWINGS

In order to more clearly illustrate the technical solutions in the embodiments of the present application or in the prior art, the drawings to be used in the description of the embodiments of the present application or the prior art will be described briefly below. Obviously, the drawings in the following description are merely some embodiments of the present application. For those of ordinary skill in the art, other drawings can also be obtained according to these drawings without the inventive labor.

DETAILED DESCRIPTION OF EMBODIMENTS

In order to make the above objectives, features and advantages of embodiments of the present application clearer, the technical solutions in the embodiments of the present application will be clearly and completely described below with reference to the accompanying drawings in the embodiments of the present application. Apparently, the described embodiments are merely some of, but not all of, the embodiments of the present application. All the other embodiments obtained by a person of ordinary skill in the art based on the embodiments of the present application without any creative effort shall fall within the scope of protection of the present application.

If a device such as a vehicle consumes much energy, the energy efficiency thereof is low. The components such as a drive wheel train and a battery pack in the vehicle all consume energy. Taking the battery pack as an example, the battery pack includes a battery module, a water cooling assembly for assisting with the operation of the battery module, etc. The battery module includes one or more cells which are configured to generate an electric current and are core components of the battery pack. The water cooling assembly includes two plates in contact with the battery module. One or both of the plates are provided with a groove, the two plates are fitted to form a cooling channel, and a coolant flows in the cooling channel and exchanges heat with the battery module. The water cooling assembly further includes a water intake pipe and a water output pipe. A cavity of the water intake pipe is in communication with the cooling channel for introducing the coolant into the cooling channel, and a cavity of the water output pipe is in communication with the cooling channel for draining the coolant. That is to say, the cavity of the water intake pipe, the cooling channel and the cavity of the water output pipe form a flow passage for flow of the coolant. The applicant has found that during the flow of the coolant in the flow passage, the pressure loss occurs because the cross-sectional area of the flow passage suddenly becomes large or small (suddenly expands or contracts), and this pressure loss directly causes a reduced energy efficiency of the entire vehicle side. A cross section of the flow passage herein means a cross section of the flow passage as viewed when the flow passage is cut by a cutter perpendicular to a flow direction of the coolant.

In view of this, the embodiments of the present application provide a device D, a battery pack 1, and a water cooling assembly. The device D may be a mobile device such as a vehicle, a ship, or a small airplane, or may be a non-mobile device, such as an electric energy storage cabinet, which is capable of providing electric energy. The vehicle may be a new energy vehicle that may be a battery electric vehicle, or may be a hybrid vehicle, an extended-range vehicle, etc.

Figure 1:
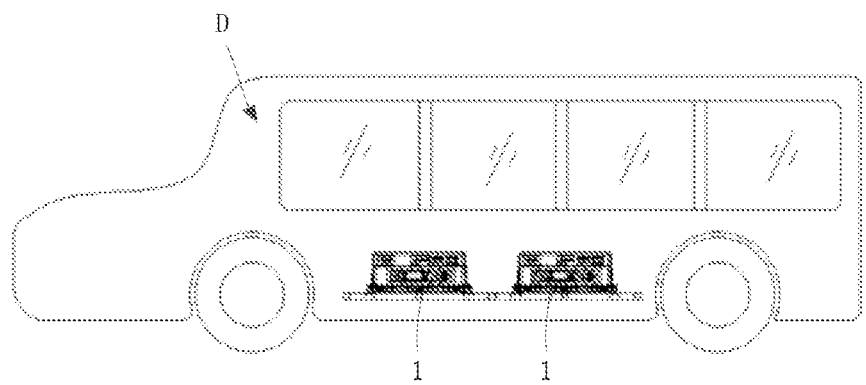
FIG. 1 is a schematic structural diagram of a vehicle provided in an embodiment of the present application.
Figure 2:
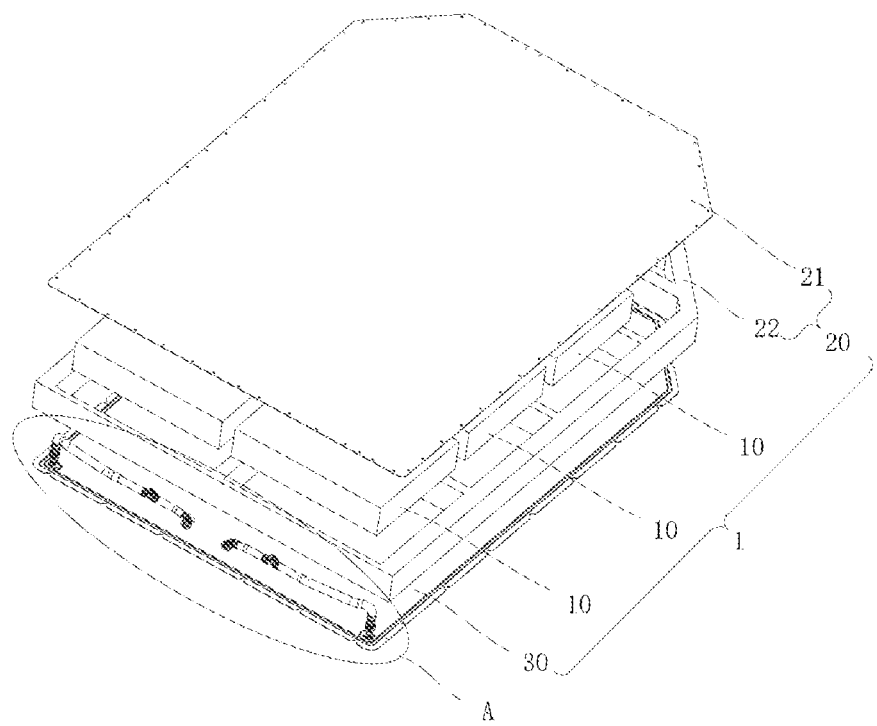
FIG. 2 is an exploded schematic structural diagram of a battery pack in FIG. 1.
Figure 3:
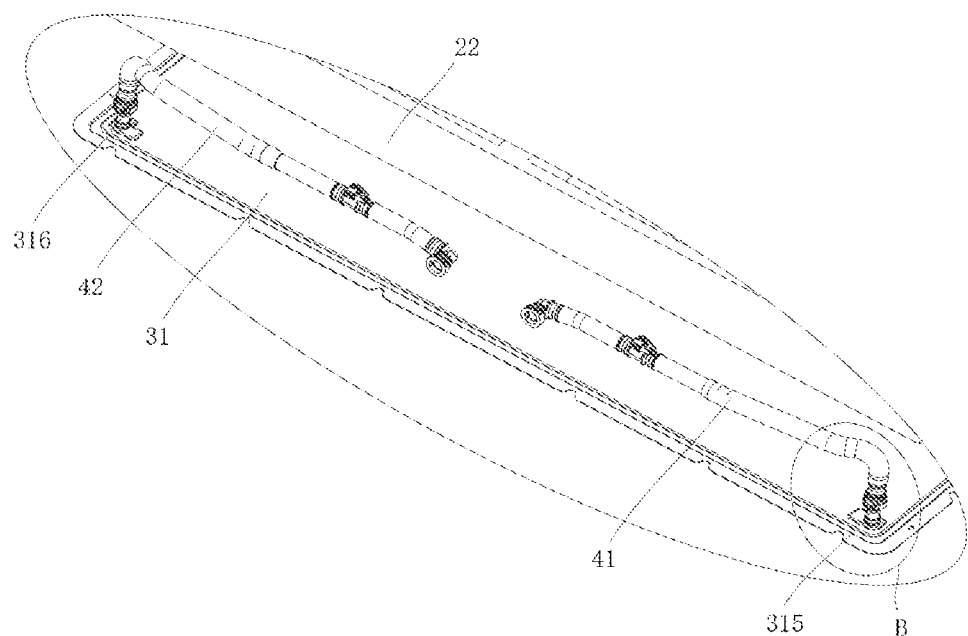
FIG. 3 is a schematic structural diagram of part A in FIG. 2.
Figure 4:
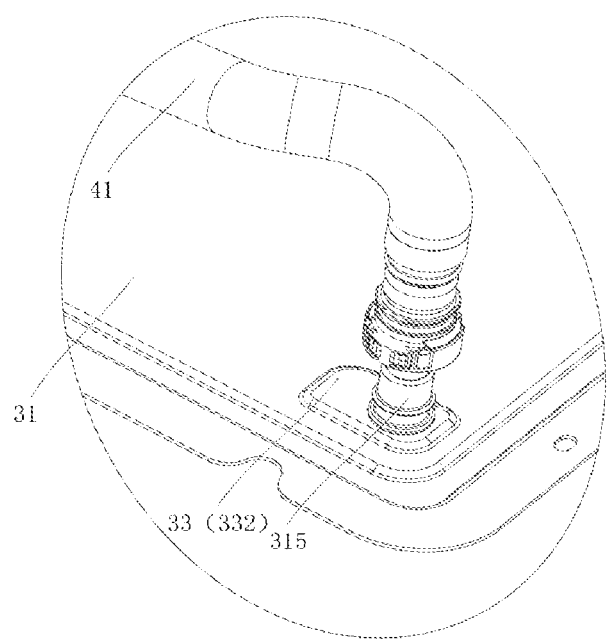
FIG. 4 is a schematic structural diagram of part B in FIG. 3.

Taking a vehicle as an example, FIG. 1 is a schematic structural diagram of a vehicle according to an embodiment of the present application. FIG. 2 is an exploded schematic structural diagram of a battery pack in FIG. 1. FIG. 3 is a schematic structural diagram of part A in FIG. 2. FIG. 4 is a schematic structural diagram of part B in FIG. 3. Referring to FIGS. 1 to 4, the vehicle may include a battery pack 1 and a vehicle body. The battery pack 1 is configured to provide power to power consuming assemblies in the vehicle body. The power consuming assemblies may be different depending on the device D. For example, when the device D is a vehicle, the power consuming assemblies in the vehicle body may be an electric motor, a loudspeaker, etc.

The battery pack 1 may be horizontally arranged at the bottom of the vehicle body. The battery pack 1 may include a plurality of battery modules 10 and a protective case 20 for receiving the plurality of battery modules 10.

The protective case 20 may include a case cover 21 and a case body 22. The case body 22 has a hollow structure and is provided with an opening at one end. The battery modules 10 are received in the case body 22, and the case cover 21 covers the opening to package the battery modules 10 in the protective case 20.

As shown in FIG. 2, each of the battery modules 10 may include one or more cells (not shown in the figures), and the battery modules 10 are each packaged and then arranged side-by-side in the protective case 20.

Each of the cells includes a positive electrode plate and a negative electrode plate that are separated by a separator and received in a housing of the cell. The positive electrode plate, the separator and the negative electrode plate after being laminated or wound may be packaged by the housing made of steel or aluminum to form a prismatic or cylindrical cell, or may be packaged as a pouch cell by a flexible housing such as an aluminum-plastic composite film. The device D using the battery pack 1 may selectively use a prismatic cell, a cylindrical cell or a pouch cell as required.

The positive electrode plate and the negative electrode plate of the cell are both provided with an active material, the active material chemically reacts with an electrolyte in the housing, and electrons generated during the chemical reaction can flow between the positive electrode plate and the negative electrode plate to form an electric current.

Since heat is generated during the chemical reaction between the active materials and the electrolyte, and the use temperature of the battery pack 1 is also affected by the ambient temperature, in order to prevent the performance of the battery pack 1 from being affected by overheating, the battery pack 1 is further provided with a water cooling assembly 30 and a water supply assembly. The water cooling assembly 30 is in contact with the battery modules 10 for cooling the cells in each battery module 10; and the water supply assembly is configured to supply a coolant to the water cooling assembly 30 and recycle the coolant.

The water supply assembly includes a water supply pipe 41, a water return pipe 42, and a water reservoir (not shown in the figures). The water supply pipe 41 and the water return pipe 42 are both in communication with the water reservoir. The end of the water supply pipe 41 facing away from the water reservoir is connected to the water cooling assembly 30, and the end of the water return pipe 42 facing away from the water reservoir is also connected to the water cooling assembly 30 to form a circulating water path such that the coolant can be recycled.

The water reservoir is arranged outside the protective case 20 and connected to the vehicle body. Also, the water supply pipe 41 and the water return pipe 42 may be arranged inside the protective case 20 or outside the protective case 20 depending on the structure of the battery pack 1.

Figure 5:
FIG. 5 is a schematic structural diagram of a body portion in FIG. 2.
Figure 6:
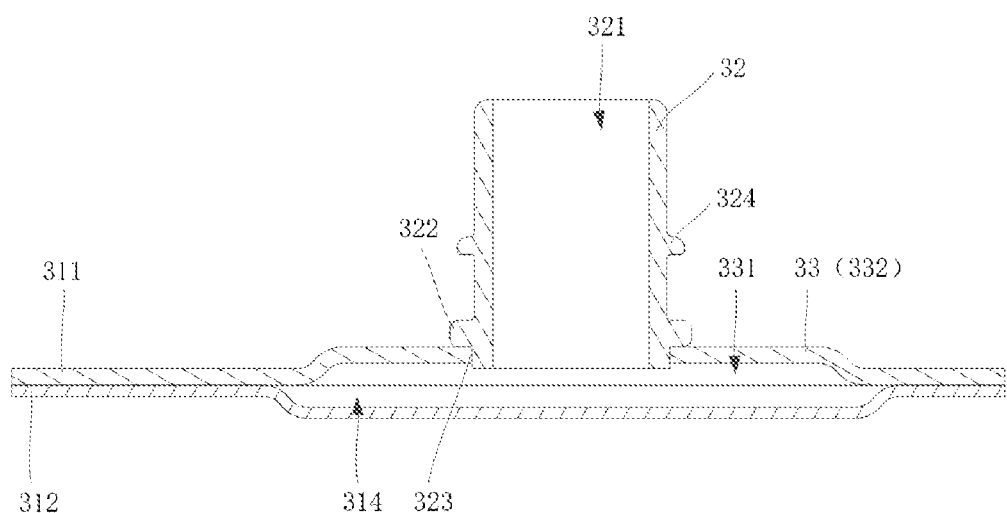
FIG. 6 is a structural cross-sectional view of FIG. 5 along line C-C.
Figure 7:
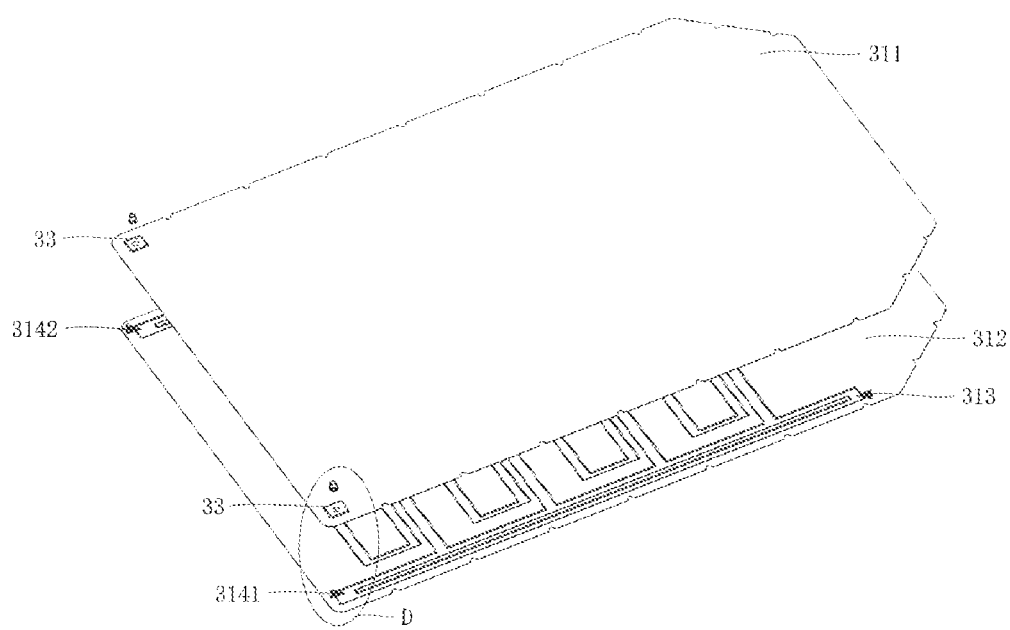
FIG. 7 is an exploded schematic structural diagram of the body portion in FIG. 5.
Figure 8:
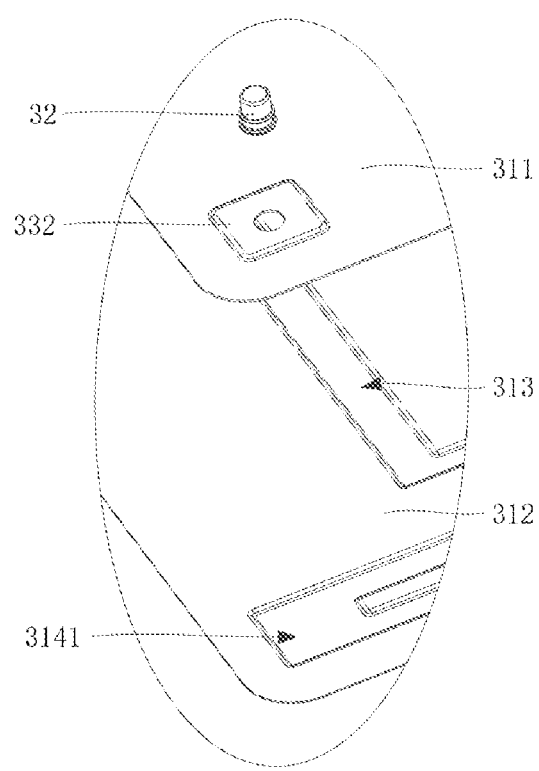
FIG. 8 is a partial schematic structural diagram of part D in FIG. 7.
Figure 9:
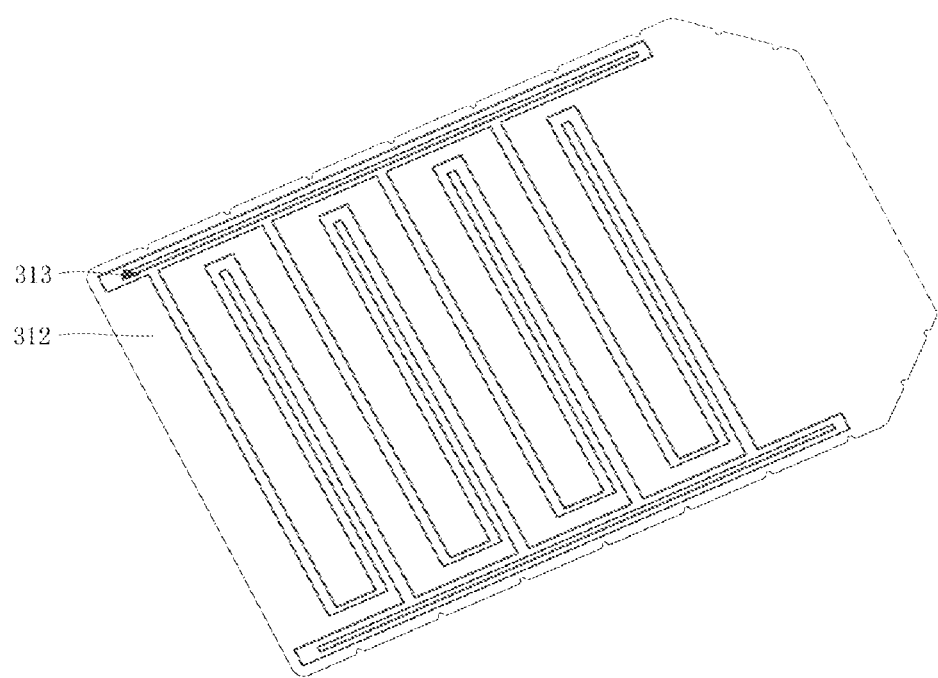
FIG. 9 is a schematic structural diagram of a second plate in FIG. 7.

FIG. 5 is a schematic structural diagram of a body portion in FIG. 2. FIG. 6 is a structural cross-sectional view of FIG. 5 along line C-C. FIG. 7 is an exploded schematic structural diagram of the body portion in FIG. 5. FIG. 8 is a partial schematic structural diagram of part D in FIG. 7. FIG. 9 is a schematic structural diagram of a second plate in FIG. 7. Referring to FIGS. 2, 3 and 5-9, the embodiments of the present application provide a water cooling assembly 30. The water cooling assembly 30 may include a body portion 31. The body portion 31 has a hollow structure for forming a cooling channel 314 for receiving the coolant. Considering that the battery pack 1 includes a plurality of battery modules 10 arranged in parallel, a plurality of body portions 31 may also be provided, each being arranged between two adjacent battery modules 10.

In some embodiments, the body portion 31 in this embodiment may be arranged at the bottom of the case body 22 facing away from the opening while being in contact with the plurality of battery modules 10, to decrease the number of body portions 31 and to reduce the manufacturing cost.

In some embodiments, the body portion 31 may include a first plate 311 and a second plate 312 arranged opposite each other and fittingly fixed, the plurality of battery modules 10 may all be attached to the first plate 311 or the second plate 312, or when the water cooling assembly 30 is arranged between two adjacent battery modules 10, the first plate 311 and the second plate 312 may both be in contact with the battery modules 10.

The first plate 311 and the second plate 312 may be in regular geometric shapes such as a rectangle and a circle, or in irregular shapes such as an "L" shape. As shown in FIG. 7, the first plate 311 and the second plate 312 are polygonal. The first plate 311 and the second plate 312 may be of the same material. For example, they are both aluminum plates, which are easy to conduct heat.

Referring to FIGS. 2, 7, 8 and 9 together, the body portion 31 formed by the first plate 311 and the second plate 312 is in a plate shape, and the cooling channel 314 is formed inside the body portion 31.

In order to form the cooling channel 314, the side of the first plate 311 facing the second plate 312 may be provided with a groove 313, or the side of the second plate 312 facing the first plate 311 may be provided with a groove 313. In some embodiments, the side of the first plate 311 facing the second plate 312 and the side of the second plate 312 facing the first plate 311 may alternatively be both provided with grooves 313. In this case, the two grooves 313 are arranged opposite each other and are in communication with each other to form the cooling channel 314, and the depth of the groove 313 is less than the thickness of the first plate 311 or the second plate 312 (not shown in the figures).

In some embodiments, the groove 313 may also be formed by pressing the first plate 311 and/or the second plate 312. Specifically, referring to FIGS. 6 to 8, the second plate 312 may be provided with a groove 313 recessed toward the side facing away from the first plate 311, in which case the first plate 311 may be a flat plate, the first plate 311 is connected to the second plate 312, and the first plate 311 covers the groove 313 such that a space enclosed by the groove 313 constitutes the cooling channel 314.

In some embodiments, it is also possible that the first plate 311 is provided with a groove 313, or the first plate 311 and the second plate 312 are both provided with grooves 313.

In order to reduce the pressure loss when the coolant flows in the cooling channel 314, a pressing depth of the groove 313 may be increased. However, increasing the pressing depth of the plate will cause lower strength of the plate. In order to avoid the problem of insufficient strength caused by excessive thinning of the plate, the depth of the groove 313 should not be too large. Illustratively, when the plate is an aluminum plate, the maximum pressing depth of the groove 313 is less than 3 times the thickness of the plate. That is to say, when the aluminum plate has a material thickness of 1.5 millimeters (mm), the groove 313 has a pressing depth limit of 4.5 mm, and the groove 313 may have a depth of 3.5 mm in order to improve the use safety of the water cooling assembly 30.

In some embodiments, when the grooves 313 are pressed on both the first plate 311 and the second plate 312, the two grooves 313 are arranged opposite each other and are in communication with each other, so that the cooling channel 314 formed by the two grooves 313 have a large cross-sectional area, the coolant has a low flow rate and a small pressure loss, and the cooling assembly has a high heat exchange rate. A cross section of the cooling channel 314 herein refers to a cross section of the cooling channel 314 as viewed when the cooling channel 314 is cut by a cutter perpendicular to the flow direction of the coolant.

The structure of the cooling channel 314 may be different depending to the pressing form of the groove 313. Illustratively, a plurality of grooves 313 (not shown in the figures) may be provided in parallel, one end of each groove 313 is located on one side of the body portion 31 and is in communication with the water supply pipe 41 to introduce the coolant, and the other end of each groove 313 is located on the other opposite side of the body portion 31 and is in communication with the water return pipe 42 to drain the coolant, such that a flow distance and the pressure loss of the coolant are small.

In order to reduce the pressure loss as the coolant flows in the cooling channel 314, the pressing width of the groove 313 may also be increased. When the groove 313 is pressformed on the plate, the width of the groove 313 is related to the area of the plate and the length of the cooling channel 314. If the pressing width of the groove 313 is too large, the length of the cooling channel 314 will be decreased, and a user can perform settings as required.

In some embodiments, no groove 313 may be provided on the plate in contact with the battery module 10 so as to increase the contact area between the battery module 10 and the plate and increase the cooling efficiency, and the connection area between the first plate 311 and the second plate 312 may also be increased, such that the connection strength of the body portion 31 is high. Illustratively, the groove 313 may be provided on the second plate 312, and the space enclosed by the first plate 311 and the groove 313 constitutes the cooling channel 314.

In this case, the battery module 10 can be adhered and fixed to the first plate 311 by means of a heat-conducting structural adhesive. In order to decrease the volume of the battery pack 1, the water supply assembly may be arranged on one side of the first plate 311, namely, the water intake pipe 315 and the water output pipe 316 are both arranged on the first plate 311, achieving a compact structure and a small size.

Referring to FIGS. 3, 7 and 8, the cooling channel 314 has a water intake end 3141 and a water output end 3142, and accordingly, the water cooling assembly 30 further includes a first connecting portion 32 having a communication cavity 321. The first connecting portion 32 may include a water intake pipe 315 and a water output pipe 316 that are connected to the body portion 31. The water intake pipe 315 is in communication with the water intake end 3141, and the water output pipe 316 is in communication with the water output end 3142. The water intake pipe 315 and the water output pipe 316 may both protrude from an outer wall surface of the body portion 31, and are detachably connected to the water supply pipe 41 and the water return pipe 42 respectively.

The water intake pipe 315 is in communication with the water supply pipe 41 for introducing the coolant into the cooling channel 314, and the water output pipe 316 is in communication with the water return pipe 42 for draining the coolant from the cooling channel 314. The coolant may be water, ethylene glycol, etc. The coolant exchanges heat with the battery modules 10 during flowing to cool the battery modules 10.

Depending on the arrangement of the battery pack 1, the water intake pipe 315 and the water output pipe 316 may be both arranged on the first plate 311 or the second plate 312, or may be respectively arranged on the first plate 311 and the second plate 312. For example, the water intake pipe 315 may be arranged on the first plate 311, and the water output pipe 316 may be arranged on the second plate 312.

When the water intake pipe 315 and the water output pipe 316 are both arranged on the first plate 311, the water intake pipe 315 and the water output pipe 316 may be located at any position of the first plate 311 depending on the arrangement of the device D. For example, the water intake pipe 315 and the water output pipe 316 may be arranged adjacent to each other, or arranged on opposite sides of the first plate 311 respectively. Taking the case where the first plate 311 and the second plate 312 are both rectangular as an example, the water intake pipe 315 and the water output pipe 316 may be respectively arranged at different included angles with respect to the first plate 311, or may be respectively arranged at edges of the first plate 311, or may be arranged in the middle of the first plate 311, which will not be limited in this embodiment.

Further, in order to improve the energy efficiency of the device D, it is considered in the embodiment of the present application that a second connecting portion 33 is arranged on the water cooling assembly 30, and the second connecting portion 33 may be arranged at the position where the cross-sectional area of the flow passage of the water cooling assembly 30 expands suddenly or contracts suddenly, so as to reduce the pressure drop of the coolant flowing through the second connecting portion 33, namely, to reduce the pressure loss of the coolant at the sudden expansion or contraction position, to avoid additional consumption of the power of a coolant driving member, and to increase the cooling efficiency of the water cooling assembly 30, the charge/discharge efficiency of the battery pack 1 and the energy efficiency of the vehicle.

Due to the sudden expansion or contraction of the cross section where the body portion 31 is in communication with the first connecting portion 32, the second connecting portion 33 may be arranged between the body portion 31 and the first connecting portion 32, the second connecting portion 33 has an inner cavity 331, and the inner cavity 331 is in communication with the cooling channel 314 and the communication cavity 321. The second connecting portion 33 may be formed on the body portion 31 as a part of the body portion 31, or may be formed on the first connecting portion 32 as a part of the first connecting portion 32, or may be arranged between the body portion 31 and the first connecting portion 32 as a separate component, which will not be limited in this embodiment.

The second connecting portion 33 may be arranged on the first plate 311 and/or the second plate 312 depending on the positions where the water output end 3142 and the water intake end 3141 are arranged. That is to say, when the water intake pipe 315 and the water output pipe 316 are both arranged on the first plate 311, the second connecting portion 33 is arranged on the first plate 311. When the water intake pipe 315 and the water output pipe 316 are both arranged on the second plate 312, the second connecting portion 33 may be arranged on the second plate 312. When the water intake pipe 315 and the water output pipe 316 are respectively arranged on the first plate 311 and the second plate 312, the second connecting portion 33 may be provided on the first plate 311 or the second plate 312, or the second connecting portion 33 may be arranged on both the first plate 311 and the second plate 312 respectively.

Sudden expansion may be formed between the water intake pipe 315 and the body portion 31, and sudden contraction may be formed between the water output pipe 316 and the body portion 31. Accordingly, the second connecting portion 33 may be separately arranged at the water intake end 3141 or the water output end 3142, or may be arranged at both the water intake end 3141 and the water output end 3142, which will not be limited in this embodiment.

Further, the second connecting portion 33 serves as a buffer structure for modifying the sudden expansion or contraction of the cross section of the flow passage into gradual expansion or contraction. Specifically, the cross-sectional area of the end face of the inner cavity 331 close to the cooling channel 314 is greater than that of the end face of the communication cavity 321 close to the inner cavity 331, so as to reduce the pressure drop of the coolant at the position where the second connecting portion 33 is located. A cross section of the inner cavity 331 herein refers to a cross section of the inner cavity 331 as viewed when the inner cavity 331 is cut by a cutter perpendicular to the flow direction of the coolant. A cross section of the communication cavity 321 herein refers to a cross section of the communication cavity 321 as viewed when the communication cavity 321 is cut by a cutter perpendicular to the flow direction of the coolant.

Taking the case where sudden expansion is modified into gradual expansion as an example, when the first connecting portion 32 is the water intake pipe 315, the end of the communication cavity 321 in the water intake pipe 315 close to the cooling channel 314 has a cross-sectional area smaller than that of the cooling channel 314 in the flow direction of the coolant, and when the coolant is introduced into the cooling channel 314 through the water intake pipe 315, the cross-sectional area suddenly expands, and the pressure loss of the coolant is large. In this embodiment, the second connecting portion 33 is arranged between the water intake pipe 315 and the body portion 31, and the end of the inner cavity 331 in the second connecting portion 33 close to the cooling channel 314 has a cross-sectional area greater than that of the end of the communication cavity 321 in the water intake pipe 315 close to the inner cavity 331. That is to say, the cross-sectional area of part of the inner cavity 331 or the cross-sectional area of the whole inner cavity 331 is greater than that of the communication cavity 321, and the sudden expansion between the water intake pipe 315 and the body portion 31 is modified into gradual expansion, so that the pressure loss of the coolant is reduced.

The second connecting portion 33 is arranged between the body portion 31 and the first connecting portion 32, and the flow rate of the coolant in the inner cavity 331 is smaller than that of the coolant in the communication cavity 321. Provided that a segment of the first connecting portion 32 having the same length as the second connecting portion 33 is arranged in the flow direction of the coolant, the pressure drop of the coolant in the second connecting portion 33 is smaller than that of the coolant in the segment of the first connecting portion 32. That is to say, the pressure loss of the coolant can be reduced after the second connecting portion 33 is arranged between the body portion 31 and the first connecting portion 32.

With continued reference to FIGS. 6, 7, and 8, the coolant impacts the second plate 312 through the first connecting portion 32 and is then diverted into the cooling channel 314. During the diverting, the speed of the coolant becomes zero in a direction perpendicular to the second plate 312.

After the second connecting portion 33 is provided, since the flow rate of the coolant flowing through the second connecting portion 33 becomes small, the coolant can impact the second plate 312 at a lower speed, the loss of impact energy is smaller, and the service life of the second plate 312 is prolonged.

In some embodiments, if the coolant is introduced into the cooling channel 314 or drained from the cooling channel 314 through the second connecting portion 33, the end face of the inner cavity 331 close to the communication cavity 321 may have a cross-sectional area less than or equal to that of the end face of the body portion 31 close to the inner cavity 331. Specifically, the body portion 31 has an opening that is in communication with the second connecting portion 33, and with the above-mentioned arrangement, it is possible to avoid that the opening area of the opening is less than the cross-sectional area of the end face of the inner cavity 331 close to the cooling channel 314. That is to say, it is avoided that sudden expansion and contraction both occur at the position where the second connecting portion 33 is in communication with the cooling channel 314, and the pressure loss of the coolant is smaller.

Further, it can be seen from the above embodiment that the second connecting portion 33 may be arranged on the first plate 311 and/or the second plate 312.

Taking the case where the second connecting portion 33 is arranged on the first plate 311 as an example, depending on the positions where the water supply pipe 41 and the water return pipe 42 are arranged in the battery pack 1, the second connecting portion 33 may be located at any position of the first plate 311. For example, the second connecting portion 33 may be located at a peripheral edge position of the first plate 311, and an extending direction of the inner cavity 331 may be set parallel to, or at an acute angle or an obtuse angle to, a plane where the first plate 311 is located. In some embodiments, the second connecting portion 33 may alternatively be located on the side of the first plate 311 facing away from the second plate 312, and the second connecting portion 33 may be firmly connected to the first plate 311, providing a good sealing performance; and the extending direction of the inner cavity 331 may be set perpendicular to, or inclined to, the plane where the first plate 311 is located.

It will be appreciated that when the second connecting portion 33 is arranged on the second plate 312, the second connecting portion may also be arranged on the side of the second plate 312 facing away from the first plate 311.

In consideration of the fact that a peripheral space of the body portion 31 is small, this embodiment is described by taking the case where the second connecting portion 33 is arranged on the first plate 311 and the extending direction of the inner cavity 331 is perpendicular to the plane where the first plate 311 is located as an example. The first plate 311 has a large space on the side perpendicular to its own direction, and the second connecting portion 33 may be arranged at any position of the first plate 311 as required. Furthermore, since the first plate 311 has a large space on the side perpendicular to its own direction, the size of the second connecting portion 33 may be large enough, that is, the cross-sectional area of the inner cavity 331 may be large enough so as to provide a better effect of reducing the pressure drop.

It is well known to a person skilled in the art that cross-sectional shapes having the same cross-sectional area may be different. For example, the cross-sectional shape may be circular, elliptical or polygonal. In some embodiments, in order to reduce the pressure loss of the coolant, the cross-sectional shape of the inner cavity 331 may be the same at any position thereof, such that an inner wall surface of the second connecting portion 33 can smoothly transition. Illustratively, the cross-sectional shape of the inner cavity 331 may be circular or rectangular at any position thereof.

In some embodiments, the inner cavity 331 has a first end and a second end that are arranged opposite to each other in the flow direction of the coolant, and the cross-sectional area of the inner cavity 331 may be gradually decreased from the first end of the inner cavity 331 to the second end of the inner cavity 331. That is to say, when the second connecting portion 33 is arranged at the end where the water intake end 3141 is located, the cross-sectional area of the inner cavity 331 is gradually increased in the flow direction of the coolant; and when the second connecting portion 33 is arranged at the end where the water output end 3142 is located, the cross-sectional area of the inner cavity 331 is gradually decreased in the flow direction of the coolant.

The second connecting portion 33 may have a structure with a gradually changing cross-sectional area. Accordingly, the inner cavity 331 is a tapered cavity with a gradually changing cross-sectional area, the larger end of the inner cavity 331 is the first end and is connected to the cooling channel 314, and the smaller end of the inner cavity 331 is the second end and is connected to the communication cavity 321, such that the inner cavity 331 is in communication with the communication cavity 321 and the cooling channel 314.

The smaller end of the inner cavity 331 may have a cross-sectional area greater than or equal to that of the communication cavity 321.

In some embodiments, the second connecting portion 33 may also be of a multi-segment structure. Accordingly, the inner cavity 331 may also be a multi-segment cavity. Any segment of the cavity may be a cavity with a constant cross section or a cavity with a variable cross section, as long as the cross-sectional area of the cavity close to one end of the cooling channel 314 is greater than that of the cavity facing away from one end of the cooling channel 314.

Specifically, the second connecting portion 33 may be integrally formed with the first plate 311. In this case, the second connecting portion 33 may be a projection portion 332 formed on the first plate 311, and the projection portion 332 may be located at either the water intake end 3141 or the water output end 3142, or may be arranged at both the water intake end 3141 and the water output end 3142.

Referring to FIGS. 6 to 8, the projection portion 332 may be formed by pressing the first plate 311, and the pressing depth of the projection portion 332 is also limited by the thickness of the first plate 311. In view of the pressing process, the projection portion 332 may have a rounded corner. That is to say, the cross-sectional area of the inner cavity 331 in the projection portion 332 is gradually changing in a direction perpendicular to the flow direction of the coolant.

Figure 10:
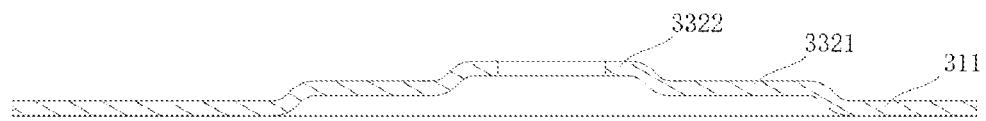
FIG. 10 is a schematic structural diagram of a second connecting portion.

FIG. 10 is a schematic structural diagram of a second connecting portion. Referring to FIG. 10, when the projection portion 332 is a multi-segment structure, the projection portion 332 may also be press-formed in a stepped shape. Illustratively, the projection portion 332 may include a first projection portion 3321 and a second projection portion 3322. The first projection portion 3321 is formed by pressing the first plate 311, the second projection portion 3322 is formed by pressing the first projection portion 3321, and the first projection portion 3321 has a pressing area greater than that of the second projection portion 3322. In this case, the first projection portion 3321 and the second projection portion 3322 may constitute the second connecting portion 33 of the multi-segment structure described above. The cavities formed in the first projection portion 3321 and the second projection portion 3322 are cavities with variable cross sections in consideration of the press-forming process.

Figure 11:
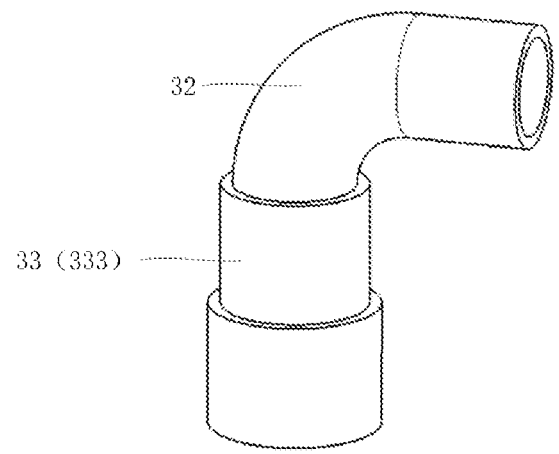
FIG. 11 is a first schematic structural diagram of a first connecting portion.
Figure 12:
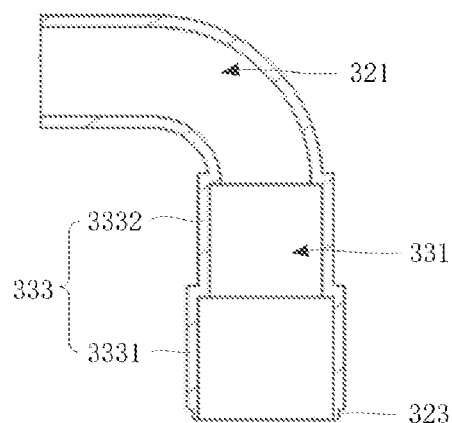
FIG. 12 is a schematic structural cross-sectional view of FIG. 11 taken along a symmetry plane of the first connecting portion.

FIG. 11 is a first schematic structural diagram of a first connecting portion. FIG. 12 is a schematic structural cross-sectional view of FIG. 11 taken along a symmetry plane of the first connecting portion. Referring to FIGS. 3, 7, 11 and 12, the second connecting portion 33 may also be a hollow pipe segment 333, and the hollow pipe segment 333 may be a tapered pipe segment (not shown in the figures). The hollow pipe segment 333 may be arranged at the water intake end 3141 for introducing the coolant, or may be arranged at the water output end 3142 for draining the coolant, or may be arranged at both the water intake end 3141 and the water output end 3142. Taking the case where the hollow pipe segment 333 is arranged on one side of the water intake end 3141 as an example, the may be fixed to the water intake pipe 315 by welding. That is to say, the hollow pipe segment 333 is a separate component independent of the water intake pipe 315 and the first plate 311. The hollow pipe segment 333 may also be formed as a part of the water intake pipe 315 and is formed by means of a pipe expanding process.

The hollow pipe segment 333 may also be of a multi-segment structure, and includes a first pipe segment 3331 and a second pipe segment 3332. The first pipe segment 3331 may be connected to the body portion 31, the second pipe segment 3332 is arranged at the end of the first pipe segment 3331 facing away from the body portion 31 and is connected to the first connecting portion 32, and the cavities in the first pipe segment 3331 and the second pipe segment 3332 are in communication with each other and form the inner cavity 331. The cavity corresponding to the first pipe segment 3331 may be a cavity with a constant cross section or a tapered cavity with a variable cross section, and the cavity corresponding to the second pipe segment 3332 may be a cavity with a constant cross section or a tapered cavity with a variable cross section.

In some embodiments, referring to FIGS. 11 and 12, in this embodiment, the cavity in the first pipe segment 3331 and the cavity in the second pipe segment 3332 each have the same cross-sectional area, the cross-sectional area of the cavity in the first pipe segment 3331 is greater than that of the cavity in the second pipe segment 3332, and the cross-sectional area of the cavity in the second pipe segment 3332 is greater than that of the communication cavity 321, so that the pipe segments may be formed by means of a pipe expanding process and are easy to machine and manufacture.

Figure 13:
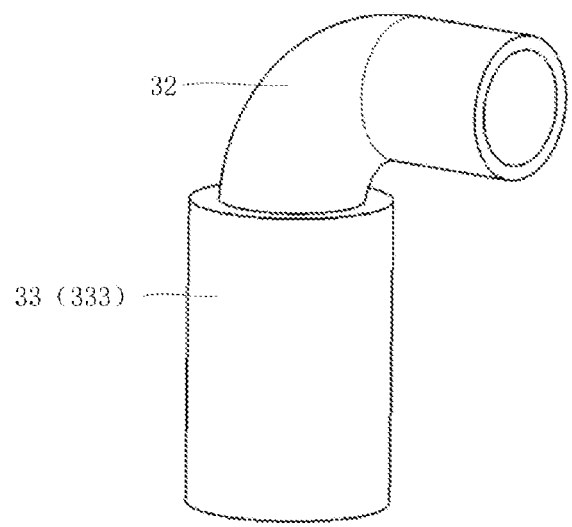
FIG. 13 is a second schematic structural diagram of the first connecting portion.
Figure 14:
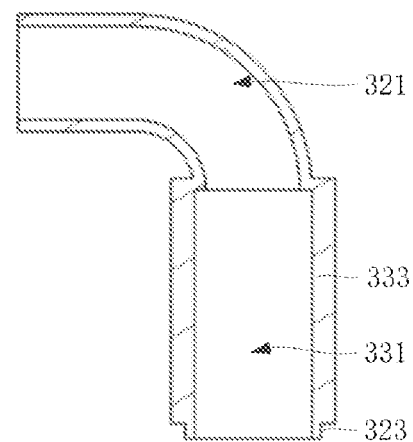
FIG. 14 is a schematic structural cross-sectional view of FIG. 13 taken along the symmetry plane of the first connecting portion.

In some embodiments, the cross-sectional area of the inner cavity 331 is the same at any position thereof. Specifically, FIG. 13 is a second schematic structural diagram of the first connecting portion. FIG. 14 is a schematic structural cross-sectional view of FIG. 13 taken along the symmetry plane of the first connecting portion. Referring to FIGS. 13 and 14, the hollow pipe segment 333 may be a cylindrical structure with a constant cross section, the cross-sectional area of the inner cavity 331 in the hollow pipe segment 333 may be the same at any position thereof, and the cross-sectional area of the inner cavity 331 is greater than that of the communication cavity 321. The structure of the inner cavity 331 or the second connecting portion 33 is not limited in this embodiment.

Of course, the second connecting portion 33 may also include both the projection portion 332 and the hollow pipe segment 333, and the second connecting portion 33 may be located at the water intake end 3141, or at the water output end 3142, or at both the water intake end 3141 and the water output end 3142, in which case the hollow pipe segment 333 and the projection portion 332 are fixed by welding.

It will be appreciated that the second connecting portion 33 may be combined in a variety of arrangements. For example, the projection portion 332 is arranged at the water intake end 3141, and the hollow pipe segment 333 is arranged at the water output end 3142. For another example, the projection portion 332 and the hollow pipe segment 333 are both arranged at the water intake end 3141, while the water output end 3142 is not provided with the second connecting portion 33. Alternatively, the hollow pipe segment 333 is arranged at both the water intake end 3141 and the water output end 3142.

With reference to FIGS. 6, 12 and 14, when the hollow pipe segment 333 is connected to the first plate 311 or the projection portion 332, an annular boss 322 or an annular groove 323 snap-fitted with the first plate 311 may be arranged on an outer wall surface of the hollow pipe segment 333, and the hollow pipe segment 333 is fixed by braze welding after being snap-fitted with the first plate 311, so that the connection is firm, and the sealing performance is good.

Figure 15:
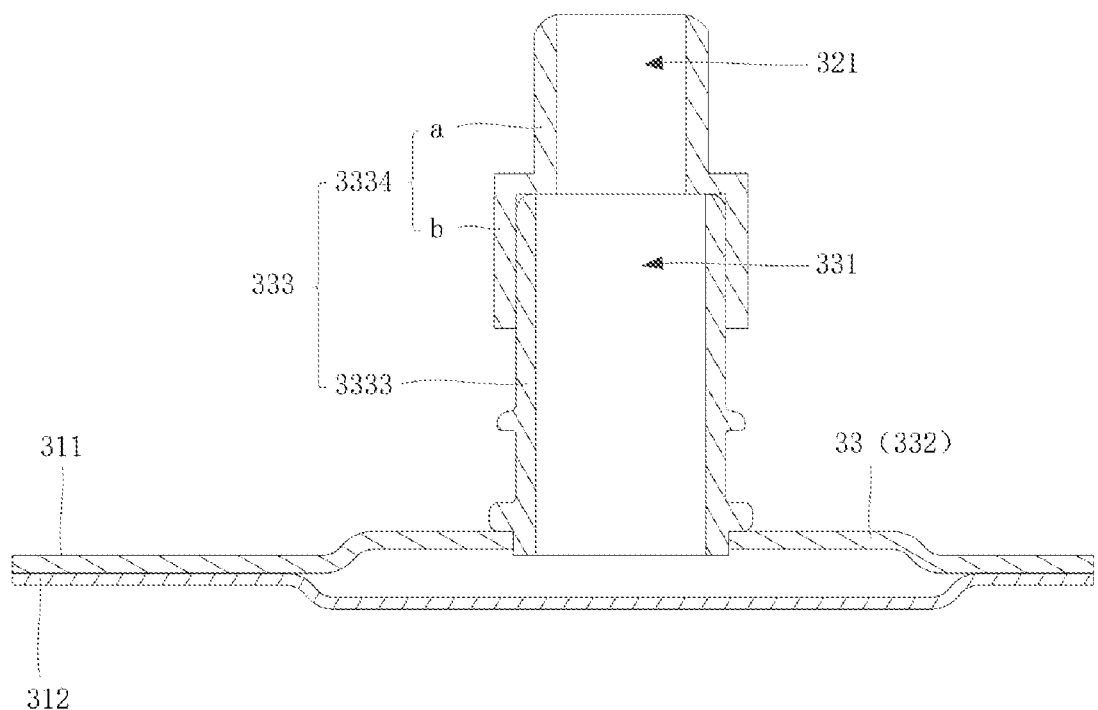
FIG. 15 is another schematic structural diagram of the first connecting portion and the second connecting portion.

In some embodiments, FIG. 15 is another schematic structural diagram of the first connecting portion and the second connecting portion. Referring to FIG. 15, this embodiment provides an implementation form in which both a projection portion 332 and a hollow pipe segment 333 are arranged at the water intake end 3141 and/or the water output end 3142. The projection portion 332 is arranged on the first plate 311. The hollow pipe segment 333 includes a first connecting pipe 3333 and a second connecting pipe 3334 that are detachably connected to each other. The first connecting pipe 3333 is connected to the projection portion 332, and the second connecting pipe 3334 is arranged at the end of the first connecting pipe 3333 facing away from the projection portion 332. Moreover, the second connecting pipe 3334 includes a connecting segment a and a sleeving segment b that are in communication with each other. The connecting segment a is configured to be connected to the water supply pipe 41 or the water return pipe 42, and the end of the sleeving segment b facing away from the connecting segment a is sleeved outside the first connecting pipe 3333.

In this case, the cross-sectional area of the cavity in the sleeving segment b is greater than that of the cavity in the first connecting pipe 3333, and the cross-sectional area of the cavity in the first connecting pipe 3333 is greater than the cross-sectional area of the cavity in the connecting segment a. That is to say, the projection portion 332 constitutes part of the cavity 331, the first connecting pipe 3333 also constitutes part of the cavity 331, and since the sleeving segment b is sleeved outside the first connecting pipe 3333, the sleeving segment b also constitutes part of the second connecting portion 33; and the connecting segment a constitutes the first connecting portion 32.

The arrangement of the second connecting portion 33 is not enumerated in this embodiment.

Further, when the projection portion 332 is arranged in a region where the body portion 31 is in contact with the battery modules 10, the contact area between the battery modules 10 and the body portion 31 is decreased, affecting the heat exchange efficiency. In addition, considering that the body portion 31 may be arranged between two adjacent battery modules 10, or may be attached to a plurality of battery modules 10, the water intake pipe 315 and the water output pipe 316 that are connected to the body portion 31 may accordingly be located between two adjacent battery modules 10 or located on an outer peripheral side of the battery pack 1. That is to say, according to the structure of the battery pack 1, the projection area of the projection portion 332 is limited by the adjacent battery modules 10, the case body 22 and other components.

Figure 16:
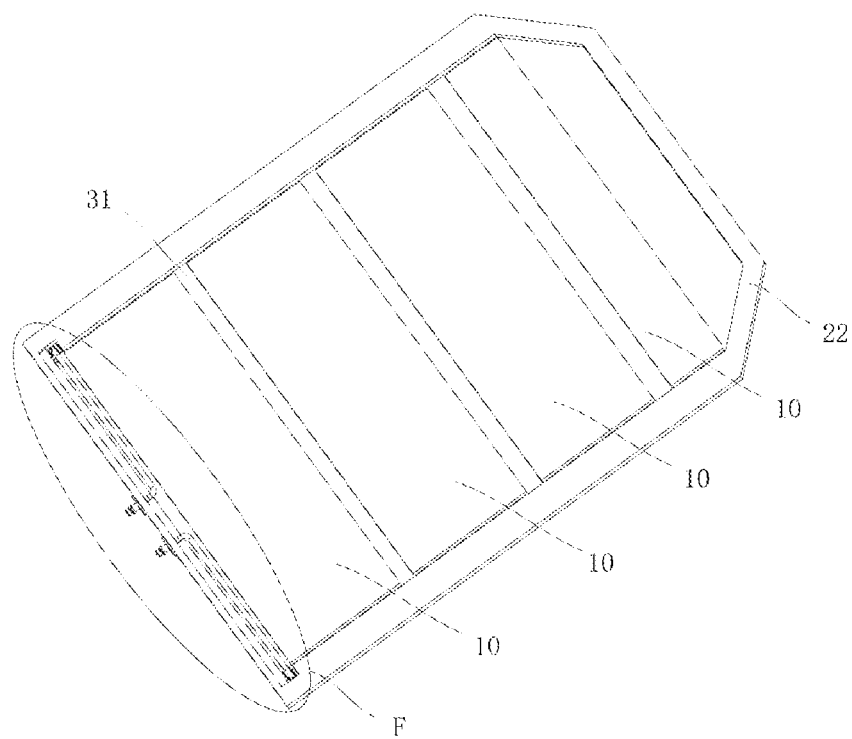
FIG. 16 is another schematic structural diagram of the battery pack.
Figure 17:
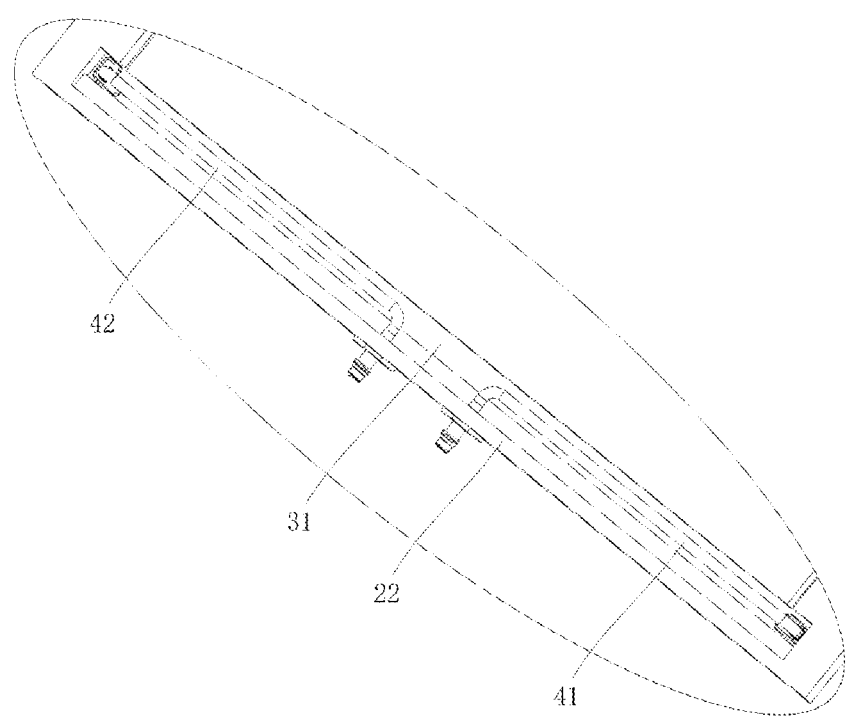
FIG. 17 is a schematic structural diagram of part F in FIG. 16.
Figure 18:
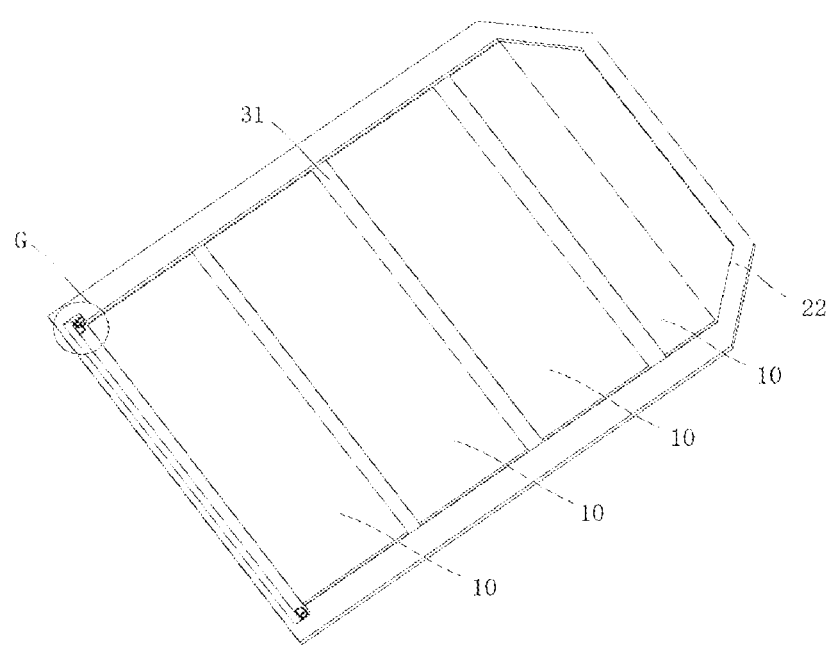
FIG. 18 is a schematic structural diagram of a case body, the body portion and a battery module in FIG. 16.
Figure 19:
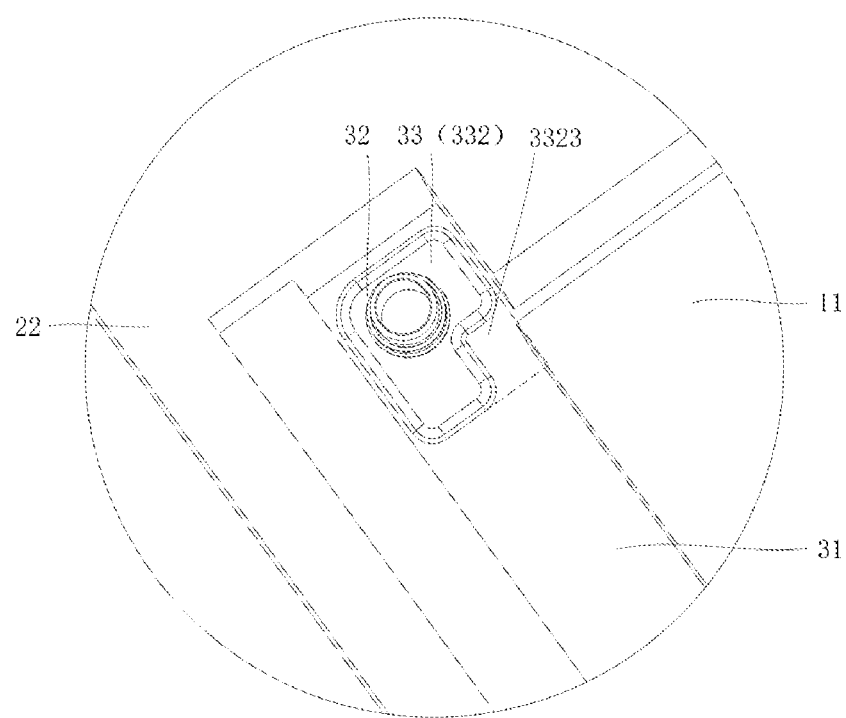
FIG. 19 is a schematic structural diagram of part G in FIG. 18.
Figure 20:
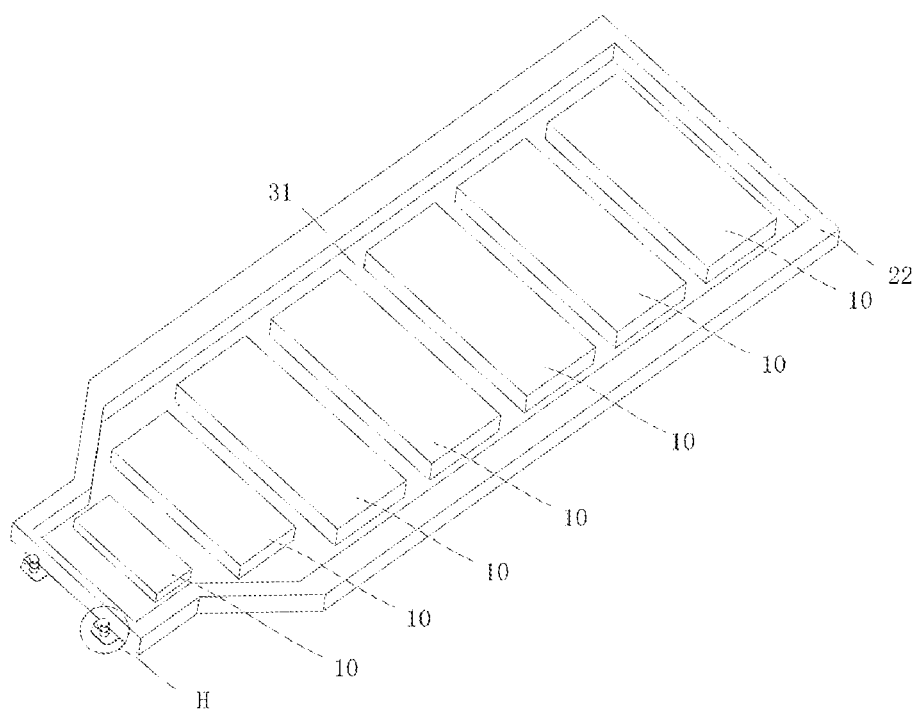
FIG. 20 is another schematic structural diagram of the battery pack.
Figure 21:
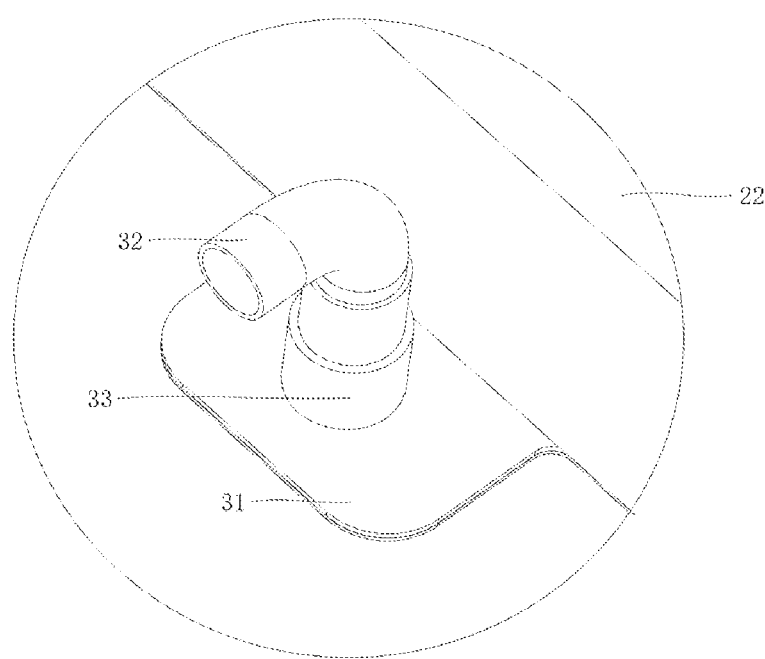
FIG. 21 is a schematic structural diagram of part H in FIG. 20.

FIG. 16 is another schematic structural diagram of the battery pack. FIG. 17 is a schematic structural diagram of part F in FIG. 16. FIG. 18 is a schematic structural diagram of the case body, the body portion and the battery module in FIG. 16. FIG. 19 is a schematic structural diagram of part G in FIG. 18. FIG. 20 is another schematic structural diagram of the battery pack. FIG. 21 is a schematic structural diagram of part H in FIG. 20. Referring to FIGS. 8 and 16 to 21, taking the case where the projection portion 332 is arranged on the outer peripheral side of the battery module 10 as an example, depending on the structure of the battery pack 1, the water supply pipe 41 and the water return pipe 42 may be arranged on an inner side of the case body 22 or on an outer side of the case body 22, the water intake pipe 315 and the water output pipe 316 may accordingly be arranged on the inner side of the case body 22 or on the outer side of the case body 22, and accordingly, the projection portion 332 may also be located inside the case body 22 or outside the case body 22.

When the projection portion 332 is arranged inside the case body 22, the projection area of the projection portion 332 is limited by the gap between the case body 22 and the battery module 10. In order to increase the projection area of the projection portion 332, part or all of the edge of the projection portion 332 may extend along an adjacent component.

The edge of the projection portion 332 may be in a regular geometric shape such as a rectangular shape, or a circular shape. Referring to FIG. 8, taking the square projection portion 332 as an example, the length of the side of the projection portion 332 may be the same as the width of the groove 313. On the one hand, it is possible to prevent the too large projection area of the projection portion 332 and to prevent the projection portion 332 from deforming when impacted by the coolant; and on the other hand, it is possible to prevent the coolant from being subjected to the pressure loss between the projection portion 332 and the groove 313 due to the fact that the width of the projection portion 332 is greater than that of the groove 313.

When the gap formed between the case body 22 and the battery module 10 is in an irregular shape, the edge of the projection portion 332 may also correspondingly be in an irregular shape. That is to say, part of the contour of the projection portion 332 may be recessed toward its interior to form a clearance region 3323. The pressure drop of the coolant becomes small when flowing through the second connecting portion 33 by increasing the projection area of the projection portion 332, while avoiding interference between the projection portion 332 and other components of the battery pack 1. Referring to FIGS. 18 and 19, the projection portion 332 may be in an "L" shape, and the clearance region 3323 formed by the projection portion 332 in the "L" shape is used for keeping clear of components such as the battery modules 10.

It will be appreciated that when the water intake end 3141 and the water output end 3142 are both provided with projection portions 332, the projection portions 332 of the water intake end 3141 and the water output end 3142 may be the same or different in shape as long as they do not interfere with adjacent components and have a set welding strength. Illustratively, the projection portion 332 located at the water intake end 3141 may be rectangular, and the projection portion 332 located at the water output end 3142 may be "L"-shaped (not shown in the figures).

When the projection portion 332 is arranged on the outer side of the case body 22, the edge thereof may be in a regular geometric shape or an irregular geometric shape.

Further, when the projection portion 332 is arranged on the inner side of the case body 22, the water supply pipe 41 or the water return pipe 42 connected to the projection portion 332 is also arranged on the inner side of the case body 22. When the projection portion 332 is arranged on the outer side of the case body 22, the water supply pipe 41 or the water return pipe 42 connected to the projection portion 332 is also arranged on the outer side of the case body 22.

The water supply pipe 41 and the water return pipe 42 may be rubber pipes. In this case, the water supply pipe 41 may be directly sleeved on the water intake pipe 315, and the water return pipe 42 may be directly sleeved on the water output pipe 316. The water supply pipe 41 and the water return pipe 42 may also be metal pipes. In this case, the water supply pipe 41 may be connected to the water intake pipe 315 via a first connector, the water return pipe 42 may be connected to the water output pipe 316 via a second connector, and the water intake pipe 315 and the water output pipe 316 may be each provided with a connecting boss 324 connected to the first connector and the second connector respectively.

The various examples or embodiments in the description are described in a progressive manner, each embodiment focuses on the differences from other embodiments, and the same and similar parts of the various embodiments can be referred to each other.

In the description, the explanation with reference to the terms such as "an embodiment", "some embodiments", "exemplary embodiments", "examples", "specific examples", or "some examples" means that specific features, structures, materials, or characteristics described in combination with the embodiment(s) or example(s) are included in at least one embodiment or example of the present application. In the description, the illustrative expressions of the above-mentioned terms are not necessarily referring to the same embodiment or example. Moreover, the specific features, structures, materials, or characteristics described herein may be combined in any one or more embodiments or examples in a suitable manner.

Finally, it should be noted that the above embodiments are merely used for illustrating rather than limiting the technical solution of the present application. Although the present application has been illustrated in detail with reference to the foregoing embodiments, it should be understood by those of ordinary skill in the art that modifications can still be made to the technical solution described in the foregoing embodiments or equivalent substitutions of some or all of the technical features thereof are also possible; while these modifications or substitutions do not make the essence of the corresponding technical solution depart from the scope of the technical solutions of the embodiments of the present application.

What is claimed is:

1. A water cooling assembly for cooling a cell, the water cooling assembly comprising:
   a body portion having a cooling channel for receiving a coolant;
   a first connecting portion connected to the body portion and having a communication cavity for introducing or draining the coolant; and
   a second connecting portion arranged between the body portion and the first connecting portion and having an inner cavity for communicating the cooling channel with the communication cavity, wherein the inner cavity has a first end and a second end that are arranged opposite to each other in a flow direction of the coolant, wherein
   an end face of the inner cavity close to the cooling channel has a cross-sectional area greater than that of an end face of the communication cavity close to the inner cavity.

2. The water cooling assembly according to claim 1, wherein, the first end of the inner cavity is configured to be in communication with the cooling channel, and the cross-sectional area of the inner cavity is gradually decreased from the first end of the inner cavity to the second end of the inner cavity.

3. The water cooling assembly according to claim 1, wherein the cross-sectional area of the inner cavity is the same at any position thereof.

4. The water cooling assembly according to claim 1, wherein the second connecting portion comprises:

a first pipe segment connected to the body portion; and a second pipe segment connected between the first pipe segment and the first connecting portion.

5. The water cooling assembly according to claim 1, wherein the second connecting portion is integrally formed with the body portion.

6. The water cooling assembly according to claim 1, wherein an end face of the inner cavity close to the communication cavity has a cross-sectional area smaller than or equal to that of an end face of the body portion close to the inner cavity.

7. The water cooling assembly according to claim 1, wherein the body portion comprises a first plate and a second plate that are arranged opposite each other, and the side of the first plate facing the second plate and/or the side of the second plate facing the first plate is provided with a groove for forming the cooling channel.

8. The water cooling assembly according to claim 7, wherein the second connecting portion is arranged on the side of the first plate facing away from the second plate and/or the side of the second plate facing away from the first plate.

9. A battery pack, comprising a plurality of cells and a water cooling assembly according to claim 1, wherein the water cooling assembly is configured to cool the plurality of cells.

10. A battery-powered device, the device comprising a battery pack according to claim 9, wherein the battery pack provides electric energy to the device.

\* \* \* \* \*